US006999829B2

(12) United States Patent
Bazzocchi et al.

(10) Patent No.: US 6,999,829 B2
(45) Date of Patent: Feb. 14, 2006

(54) REAL TIME ASSET OPTIMIZATION (75) Inventors: Renzo Bazzocchi, Milan (IT); Fabrizio Lorito, Milan (IT); Thoralf Schulz, Mentor, OH (US); Hartmut Wuttig, Solon, OH (US)

(73) Assignees: ABB Inc., Norwalk, CT (US); ABB Service S.r.l., Sesto San Giovanni (IT)

( * ) Notice: Subject to any disclaimer, the term of this patent is extended or adjusted under 35 U.S.C. 154(b) by 254 days.

(21) Appl. No.: 10/036,264

(22) Filed: Dec. 26, 2001

(65) Prior Publication Data
US 2003/0130755 A1     Jul. 10, 2003

(51) Int. Cl.
G06F 19/00    (2006.01)

(52) U.S. Cl. .......................... 700/99; 700/28; 700/90; 705/9

(58) Field of Classification Search .................. 700/90, 700/95, 97, 99, 100, 28; 702/182; 705/9
See application file for complete search history.

(56) References Cited

U.S. PATENT DOCUMENTS

| | | | | |
|---|---|---|---|---|
| 5,053,970 | A | * | 10/1991 | Kurihara et al. ............. 700/104 |
| 5,369,570 | A | * | 11/1994 | Parad .............................. 705/8 |
| 5,826,040 | A | * | 10/1998 | Fargher et al. ................. 705/8 |
| 6,006,171 | A | | 12/1999 | Vines et al. |
| 6,279,009 | B1 | | 8/2001 | Smirnov et al. |
| 6,438,436 | B1 | * | 8/2002 | Hohkibara et al. ............ 700/97 |
| 2002/0163427 | A1 | * | 11/2002 | Eryurek et al. .............. 340/500 |

OTHER PUBLICATIONS

Jan Jonsson and Kang G. Shin, A Parameterized Branch-and-Bound Strategy For Scheduling Precedence-Constrained Tasks On A Multiprocessor System, IEEE Proceedings of the International Conference on Parallel Processing, Aug. 11-15, 1997, Bloomington, IL, pp. 158-165.
Hsiao-Lan Fang, Ph.D. Thesis entitled "Genetic Algorithms In Timetabling And Scheduling", 1994, Cover page and pp. ii-xvi and 11-15, University Edinburgh.

* cited by examiner

*Primary Examiner*—Jayprakash N. Gandhi
(74) *Attorney, Agent, or Firm*—Michael M. Rickin (57) ABSTRACT

A technique to optimize both the production schedule and the maintenance of plant assets based on predetermined criteria which may be economic or otherwise. In one embodiment the technique receives at least one maintenance trigger (MT) and one production order and evaluates those inputs to propose one or more solutions for the joint scheduling of the asset maintenance and required plant production. In another embodiment a computerized maintenance management system (CMMS) acquires a new MT and proposes a new maintenance schedule. The technique transmits a blocking order to a production scheduling (PS) system for converting the maintenance request into a production schedule. In another embodiment, a CMMS acquires a new MT and asks for confirmation of a time slot to perform the maintenance action. The technique evaluates the priorities and finds based on the predetermined criteria the right time slot and communicates a request for that slot to the PS.

16 Claims, 7 Drawing Sheets

REAL TIME ASSET OPTIMIZATION

FIELD OF THE INVENTION

This invention relates to optimizing the use of production assets and more particularly to the use of real time information from plant equipment in that optimization.

DESCRIPTION OF THE PRIOR ART

A plant can produce a single product, for example, an electric power generation plant, produces electricity, or more than one product. No matter how many products the plant produces the plant uses a wide variety of different assets in that production. To make more efficient use of those assets the plant may use a production scheduling system (PS). One example of such a system is described in U.S. Pat. No. 6,279,009.

The plant must also maintain the assets used in production. To manage the maintenance of the assets the plant may make use of a computerized maintenance management system (CMMS) as a tool for planning and scheduling asset maintenance to meet the needs of the plant. The CMMS software uses information about the assets to schedule maintenance, repair and inspection of the assets. The CMMS software notifies the operations personnel of the plant when maintenance or other action is necessary for an asset.

One example of CMMS software is the MAXIMO® system offered by Project Software & Development, Inc. (PSDI) of Cambridge, Mass. U.S. Pat. No. 6,006,171 describes the integration of the MAXIMO® system with the software of a process automation system from the Foxboro Company. The integrated system allows for the identification of conditions requiring maintenance of an operational asset and can either respond automatically to such conditions or notify plant operators and engineers of required operation asset maintenance actions.

Other vendors of process automation systems such as Siemens, Honeywell and Emerson have their own version of a CMMS linked to their automation system. Common to all of these CMMSs including the CMMS described in the '171 patent is the lack of any real time optimization between the CMMS in use at a plant and the production scheduling system that may also be in use at that plant.

As can be appreciated there may be a time conflict between the scheduling of a maintenance action and the scheduling of plant production. For example a maintenance action may require that the plant stop all or part of its production or produce products with a lesser quality while maintenance is being performed. As can also be appreciated stopping all or part of the production in the plant impacts the revenue of the enterprise. In addition there is the cost to the enterprise associated with the personnel, tools and parts needed to perform the maintenance.

Since the present CMMSs and production scheduling systems lack any real time optimization these conflicts are presently managed by interaction between the plant personnel responsible for making products and those personnel responsible for maintaining the plant assets. This lack of a real time optimization between the CMMSs and production scheduling systems is not suitable for real time plant production and order fulfillment.

The lack of any integration and real time optimization between CMMSs and production scheduling systems means that a plant does not today have any way to compare its needs for maintenance and production. Thus the plant personnel cannot evaluate either the impact, economic, technical or otherwise, of an unsolved maintenance condition or the impact, economic, technical or otherwise, of fixing a maintenance condition at another time. In other words the plant personnel do not today have a means for balancing the priorities between maintenance and production.

Further the lack of any integration and real time optimization between CMMSs and production scheduling systems means that plants today do not have a real time evaluation of the static parameters, such as for example plant availability, production capacity, that are used in the scheduling tools in use at the plant.

SUMMARY OF THE INVENTION

A method for optimizing the maintenance of assets and production comprising:
  a) acquiring at least one maintenance trigger indicative that a maintenance action is or may be required for at least one of the assets;
  b) in response to the acquired at least one maintenance trigger defining in real time a maintenance schedule for the maintenance action; and
  c) transmitting in response to the defined maintenance schedule a request to a system that schedules production for a period of time in a production schedule to perform said maintenance action.

A method for optimizing the maintenance of assets and production comprising:
  a) acquiring at least one maintenance trigger indicative that a maintenance action is or may be required for at least one of the assets;
  b) in response to the acquired at least one maintenance trigger requesting in real time a period of time in a production schedule to perform the maintenance action; and
  c) determining by use of a predetermined criteria related to the production and in response to the request for the period of time in the production schedule to perform the maintenance action a time for performance of the maintenance action.

A system for optimizing the maintenance of assets and production comprising:
  a) a maintenance scheduling system responsive to at least one maintenance trigger indicative that a maintenance action is or may be required for at least one of the assets to define in real time a maintenance schedule for the maintenance action;
  b) a system for scheduling production of at least a certain quantity of a certain product; and
  c) means responsive to the defined maintenance schedule received from maintenance scheduling system for transmitting to the production scheduling system a request for a period of time in a production schedule to perform the maintenance action.

A system for optimizing the maintenance of assets and production comprising:
  a) a system for scheduling production of at least a certain quantity of a certain product;

b) a maintenance scheduling system responsive to at least one maintenance trigger indicative that a maintenance action is or may be required for at least one of the assets to generate in real time a request for a period of time in the production scheduling system to perform the maintenance action; and c) means responsive to the request for the period of time to perform the maintenance action in the production scheduling system for determining by use of a predetermined criteria related to the production and the time to perform the maintenance action a time for performance of the maintenance action and transmitting the time for performance of the maintenance action to the production scheduling system.

Before the embodiments of the invention are each explained in detail, it is to be understood that the invention is not limited in its application to the methods and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT(S)

The system of the present invention optimizes in real time both asset maintenance and production scheduling. To perform that function the system receives as inputs "production orders" and "maintenance triggers." "Production orders" (PO) are an electronic representation of a request for producing a certain quantity of a certain product. A production order may have a number of attributes, or, in general, may have other information associated with it such as priority, deadline to deliver, etc.

"Maintenance triggers" (MT) are an electronic representation of the notification that a maintenance action is or might be required somewhere in the plant. A MT can be generated in many different circumstances, such as for example the detection of a fault, the prediction that a fault will or may occur within a certain time or the scheduling of periodic maintenance activities. MTs may be generated by an instrument, a controller, or by any other software/hardware package that interacts with the plant. A MT can also be generated manually by an operator based on his or her experience.

In general, a MT is the notification process that defines a change of state in any of the dynamic data of an asset. The MT can initiate any of a number of real time responses. These response mechanisms include combinatorial logic that could initiate a series of business processes designed to take immediate action, for example:

a) notification of maintenance requirements to a maintenance scheduling application that is based on actual maintenance need as opposed to periodic schedules;

b) notification of maintenance requirements to production planning and scheduling applications that are designed to factor equipment availability into their scheduling process and transfer of information to a CMMS system for update of static information in maintenance accounting records; or c) other desired functions As a simple example assume that one or more POs have already been accepted and scheduled by the production scheduling system at the plant. When a MT is input in the system of the present invention, this implies that one or more maintenance actions may be needed. Those maintenance actions might request the stopping of a part of the production plant, or the operation of the plant in a sub-optimal way for some period of time.

Many different options are then available to process the MT and to make decisions about the action(s) to be taken in response to the acquisition of the MT. Each of those decisions have an impact on plant production, and thus have an impact on the enterprise. The impact may be for example economic but can be any other criteria that impacts the enterprise.

For example, in response to the acquisition of a MT the decision can be to stop part of the plant so that an asset that is either not functioning properly or may shortly malfunction or needs to have periodic maintenance can be either be repaired or replaced or maintained. In this instance that part of the plant cannot be used for some time for the production of products and that nonuse will result in reduced revenues. Furthermore, the decision to replace or repair or periodically maintain the asset adds additional cost to the plant operation due to the cost of the people, tools and spare parts used for the maintenance action.

Many other options can be considered in response to a maintenance trigger. For example it can be decided not to do maintenance of that part of the plant that has the asset that gave rise to the MT. This decision saves the cost of the spare parts, tools and people needed for the maintenance action, but any reduced revenues arising as a result of that asset not properly functioning will remain over time.

In general the options to be considered in response to a MT are decisions about when and if the maintenance of the affected part of the plant should be started, and how to schedule the production to use the available parts of the plant. Each option may have associated with it as described above an impact, which may be economic or otherwise, on plant revenue. The software system of the present invention allows for the calculation of the impact of a number of different options and then indicates the impact, economic or otherwise of each such option. The decision to implement an option can then be made automatically or manually by an operator upon the suggestion of the system.

Three different embodiments for the present invention are described herein. Each embodiment includes a CMMS. In describing all of these embodiments of the present invention, the term "CMMS" as used herein, means any system or tool capable of at least scheduling the maintenance of assets. Of course, the CMMS may also perform other functions in addition to scheduling of asset maintenance. Those other functions depend on the capability of the CMMS.

Figure 1:
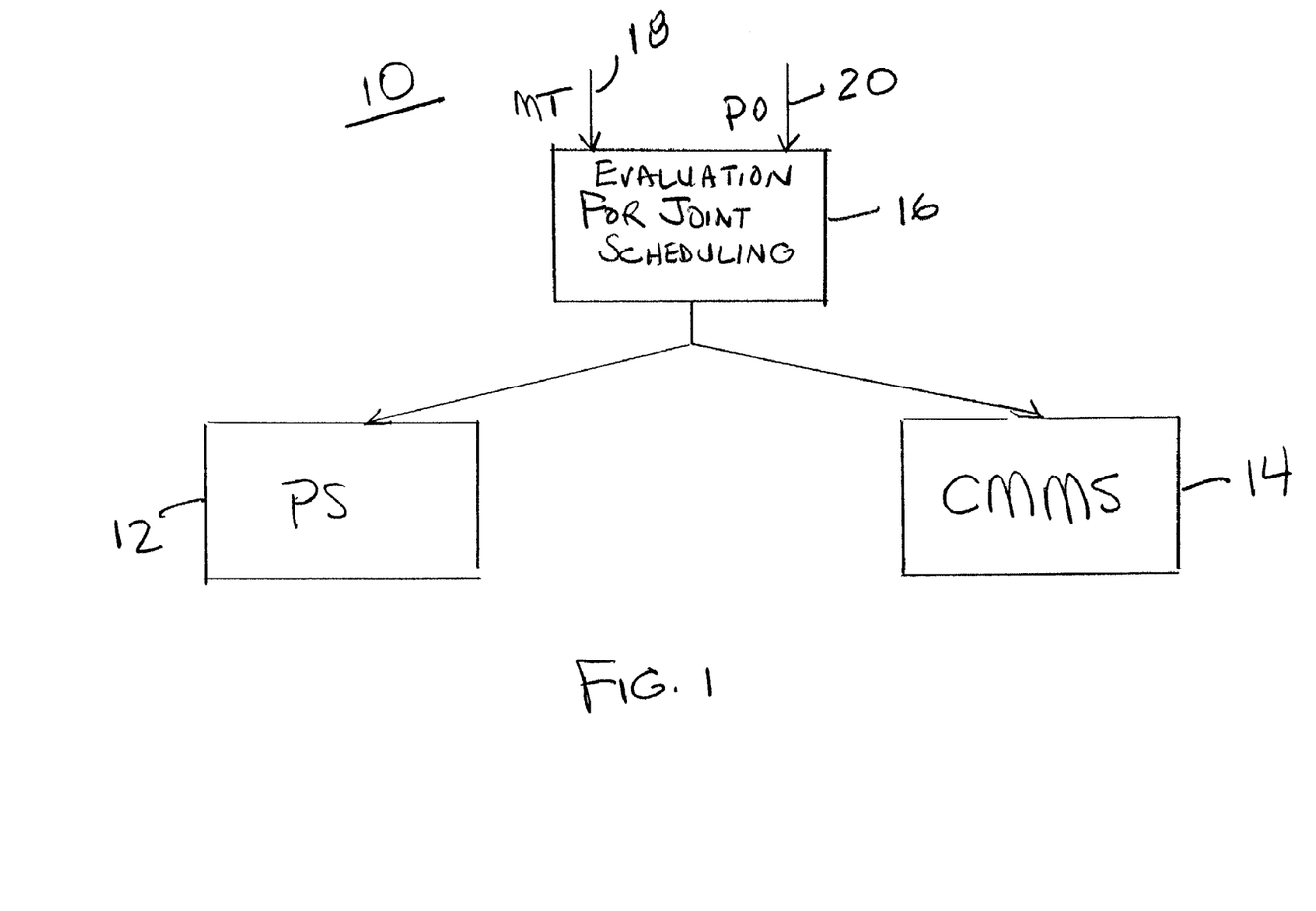
FIG. 1 shows a block diagram for one embodiment of the present invention.

Referring now to FIG. 1, there is shown a block diagram for one embodiment of the present invention. In this embodiment an enterprise 10 already has or will obtain from a third party a PS system 12 and a CMMS 14.

Enterprise 10 further includes a module 16 that receives as inputs MTs 18 and POs 20. The MTs 18 may be received from a source other than CMMS 14 or may be generated by the CMMS 14 as for example by a periodically occurring maintenance action which is managed outside of CMMS 14.

In accordance with the present invention, module 16 interacts with PS system 12 and CMMS 14 to provide the optimized maintenance and production scheduling information. The interaction of module 16 with PS system 12 and CMMS 14 requires the use of well known communication methods such as OLE, COM and web services and specific messages for module 16 to communicate with those systems. The design of such messages need not be detailed herein as they are, from the description of the system of the present invention, well within the skill of those in the art.

The module 16 receives as inputs at least one MT 18 and at least one PO 20. As will be described in more detail below, module 16 uses the same criteria to evaluate both the MT 18 and PO 20 to thereby propose from these inputs one or more solutions for the joint scheduling of the asset maintenance and the required plant production. These solutions could for example be defined based on the criteria of maximizing the economic impact of the selected schedule on the operation of the plant. The solutions can be a true optimal solution or a sub-optimal solution.

Of course any suitable criteria other than economic can be used to define the solutions. While an economic criteria may be referred to in describing the preferred embodiments as the criteria that is used to define the solutions that reference should be not used in any way to limit the scope of the present invention only to the use of that criteria to define the solutions as any other suitable criteria that allows a comparison of producing or not producing a product, doing or not doing maintenance etc. may be used to define the solutions.

The scheduling information solution proposed by module 16 requires an implementation decision. That decision may occur automatically or may require human intervention. Module 16 forwards the proposed scheduling information solution to systems 12 and 14.

Figure 1A:
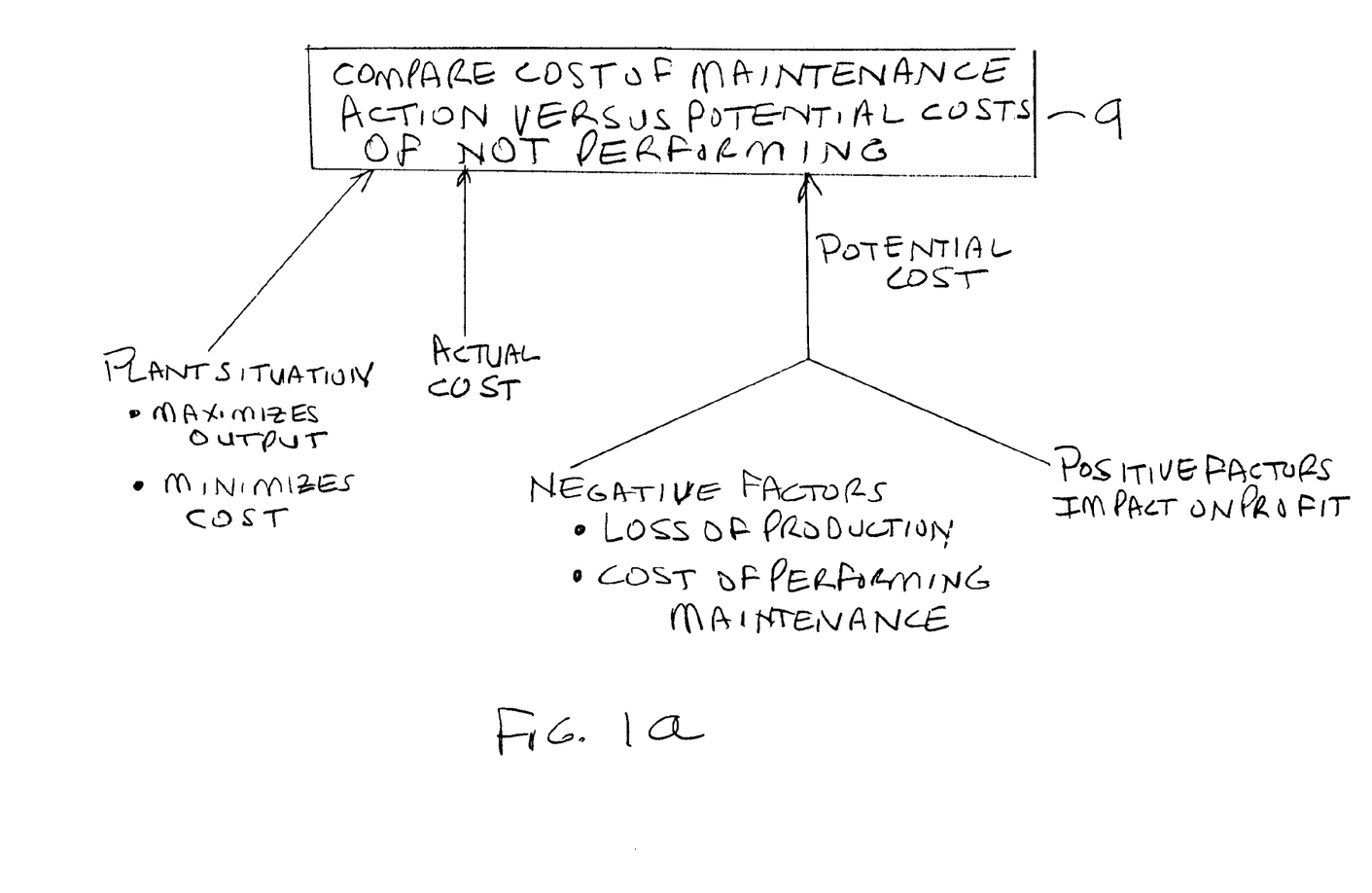
FIG. 1a shows a block diagram for the comparison of the cost of a maintenance action versus the potential action of not performing the maintenance work.

As can be appreciated the solution is organized around the profitability of the plant and may be expressed in terms of money. To arrive at a solution a comparison must be made as is shown in block 9 of the block diagram of FIG. 1a between the costs of a maintenance action versus the potential costs of not performing the maintenance work and as is described below the situation at the plant. The potential cost needs to take both positive and negative factors into account.

Negative factors include the potential loss of production and therefore missing revenue in the case of an asset failure. The missed production that will result from an asset failure must be compared to the production that will be lost during the performance of the maintenance work. The missed level of production and therefore missed revenue that will result when the asset fails must be taken into account. The performance of the maintenance action might not influence the production at all if a planned production stop can be used to perform the maintenance work.

In addition to the foregoing there is the cost of performing the maintenance work. The costs (material and labor) for performing the maintenance to prevent the actual or possible failure of the asset has to be compared to the cost of performing the maintenance when the asset has failed. This can also be expressed by a decrease of MTBF in case of redundant assets. A consideration is how much is the user of the assets allocating of value on having available redundant assets. A plant that is operating in a just in time environment where it needs to maintain the service level for its customers will need to look at maximum down time. Further the costs associated with the performance of the maintenance action must be compared to the revenue that will be missed arising from the failure of the asset.

Positive factors include the positive impact on plant profit as a result of performing the asset maintenance work. This positive profit impact may either be increased performance, or decreased cost of production and may be shown in the form of a return on investment on the performance of the maintenance action.

The interpretation or focus of the comparisons between the costs of a maintenance action versus the potential costs of not performing that action is dependent on the situation at the plant site. For example the plant may be operating in a situation where it maximizes its output. In such a situation the plant operates in a market where it can sell more than it can currently produce and thus is focused on maximizing the performance of the asset and the uptime.

Alternatively the plant may be operating in a situation where it is minimizing its cost. In this situation the plant operates in a market where it cannot sell additional products and thus will want to look at efficient production either by minimizing the costs of production, or having lower quality drop-outs, or reducing material, energy and labor consumption.

Once a criterion has been fixed, looking for a totally optimal solution can be complex and in many cases not needed. Therefore, there may be implementations of the present invention where sub-optimal solutions are selected. For example it can be decided to fix a time-slot for maintenance and reschedule the production accordingly, based on the information that during the maintenance action part of the plant:

a) will not be available; or
   b) will be available at a reduced production capacity; or
   c) will be available with a reduced guaranteed quality of the produced products.

The problem of scheduling a number of tasks to a number of resources is well known in the art. Many different approaches have been proposed. The 1994 Ph.D. thesis of Hsiao-Lan Fang ("Fang Thesis") entitled "Genetic Algorithms in Timetabling and Scheduling" and in particular pages 11 to 25 of Chapter 2 therein reviews the literature relating to algorithms used in timetabling and scheduling. As is described in the Fang Thesis the developers of such algorithms have considered many different criteria to minimize (or maximize) the result and many different approaches have been proposed to find optimal or sub-optimal solutions, using, in many cases, heuristic approaches to reduce the computational complexity of the algorithm.

Most of the existing algorithms can easily be adapted by those of ordinary skill in the art for use in the system of the present invention. In general, the two adaptation steps are that the selected algorithm must:

1) consider not only production tasks but also maintenance tasks for the overall scheduling; and
2) use a criterion, economic (as described above), technical or otherwise, to evaluate the scheduling solutions.

A simple implementation for the method in accordance with the invention that is used by module 16 is described below. This implementation is based on the "Branch and Bound" approach described by Jan Jonsson and Kang G. Shin in "A Parameterized Branch-and-Bound Strategy for Scheduling Precedence-Constrained Tasks on a Multiprocessor System" published by the IEEE in the Proc. Of the Int'l Conf. On Parallel Processing, August 11–15, 1997, Bloomington, IL, pp. 158–165.

The search for a solution is performed with the aid of a search tree that represents the solution space of the problem, that is, all possible permutations of task-to-resource assignments and schedule orderings. Each node in the search tree represents one specific task-to-resource assignment and schedule ordering, and one or many vertices represent the optimal solution whenever one exists.

The root node of the search tree represents an empty schedule and each of its descendant vertices (children) represents the scheduling of one specific task on one specific processor. The children of each of these child vertices represents the scheduling of yet another task on one processor.

A goal node in the search tree represents a complete solution where all tasks have been scheduled on the processors. An "acceptable" complete solution is also called a feasible solution. An intermediate node represents a partially complete schedule. The level of a node is the number of tasks that have been assigned to any processor in the current schedule. The value of a node depends on the sum of revenues and costs associated with the partial schedule relative to that node.

A task can either be a production task or a maintenance task. For each node it is possible to calculate the plant availability corresponding to the tasks which in that node have already been scheduled. For example, assume that a maintenance action is requested for an asset or resource 1 (R1) before a date d1. If in a certain node the maintenance action for R1 has not yet been allocated, then R1 will be shown in that node as unavailable from d1 onwards since the requesting of a maintenance action for R1 before d1 assumes that a possible fault will occur with R1 on or after that date.

Figure 1B:
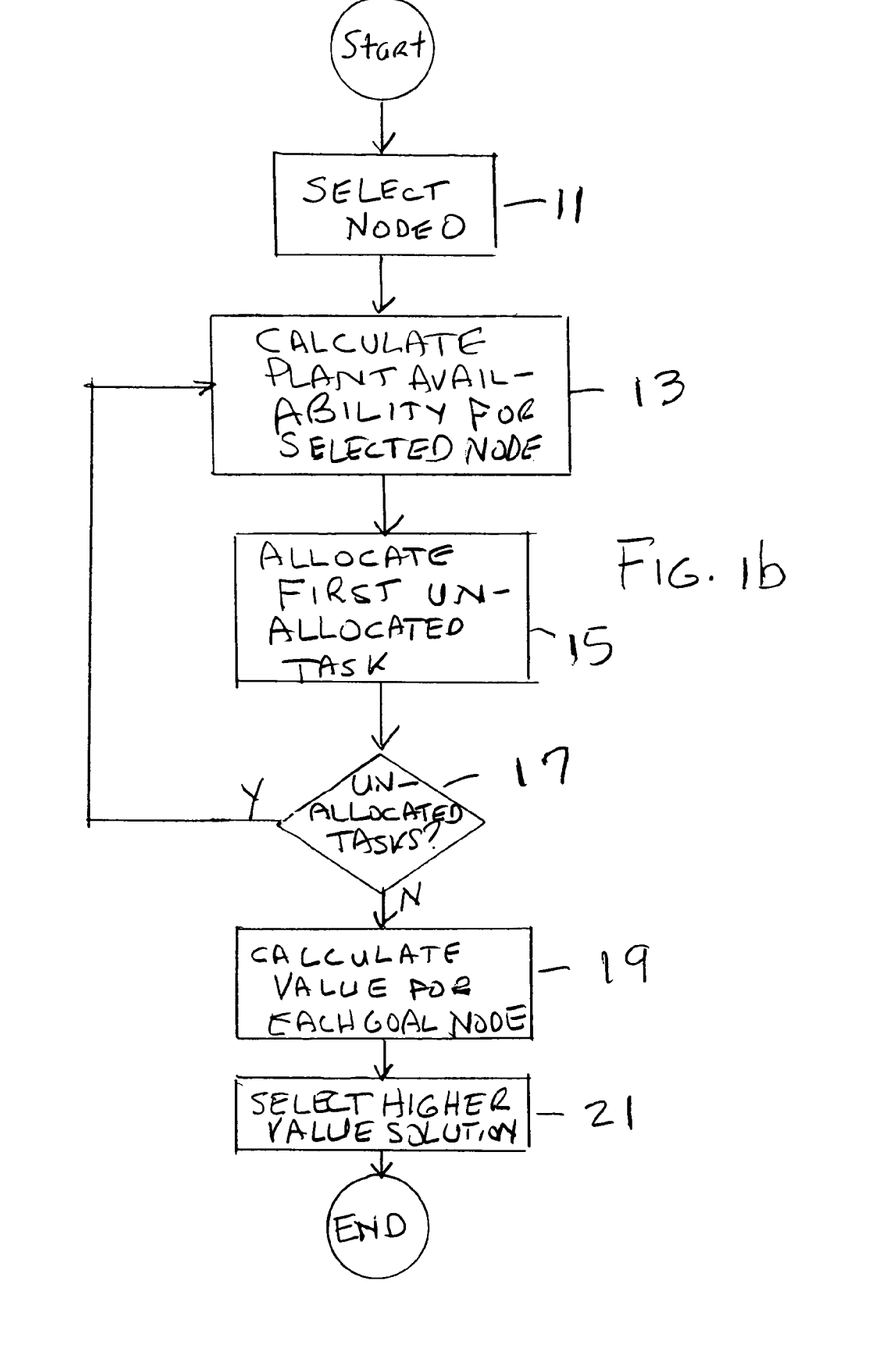
FIG. 1b shows a flowchart for the method implemented in module 16 of FIG. 1.

The steps that the method implemented in module 16 follows in searching for a solution for this embodiment are shown in the flowchart of FIG. 1b and are as follows:

1. Select node 0 (all tasks unallocated)—11 of FIG. 1b.
2. Calculate plant availability for the selected node according to the present maintenance scheduling 13 of FIG. 1b.
3. Allocate the first unallocated task (either production or maintenance) to each possible resource, in the first possible time-slot, compatible with the plant availability and generate new nodes as a result of this allocation 15 of FIG. 1b.
4. If there are still unallocated tasks, go back to step 2–17 of FIG. 1b.
5. For each goal node, calculate the value—19 of FIG. 1b.
6. Select the solution with higher value—21 of FIG. 1b.

A simple calculation of the value may be the sum of:

a) the revenues for all accomplished tasks less the direct costs associated with task (people, material etc.), i.e., net revenue;
b) minus the cost of each maintenance action accomplished; and
c) minus the penalty, if any, for any delay with respect to the promised shipping or delivery date of the product made by the plant that is impacted by the asset(s) that gave rise to the MT;

which can be expressed as:

Value=net revenue–actual maintenance cost–penalty.

One example of the operation of the method in module 16 is given below. In this example the plant has two identical assets or resources R1 and R2. The plant has two tasks, task 1 (T1) and task 2 (T2), each of which have the characteristics described in the table directly below.

| Characteristic | Task 1 | Task 2 |
| --- | --- | --- |
| Time to complete production | Three weeks | Two weeks |
| Restriction on resource to use for the production | None | None |
| Profit (revenues – direct cost) | $300 | $200 |
| Penalty | $10 per week of delay starting with week 4 | $10 per week of delay starting with week 3 |

The plant also has a MT that has the following characteristics:

a) a maintenance action must be performed on R1 starting by no later than week 3; and
b) the cost of the maintenance action is $100.

The final tree after all of the iterations is shown below in the form of a Gantt diagram with time divided in weeks. The tree has nodes 0, 1, 1.1 and 1.2; and 1.1.1 and 1.2.1 each of which are described below.

Node 0: This is the start node. The fact that the MT is unallocated results in the unavailability of R1 from week 3 onwards.

Node 1: This node shows the assignment of T1 to R2. It is only possible to assign T1 to R2, due to the need to complete T1 in three weeks and the unavailability of R1 starting in w3.

Nodes 1.1 and 1.2 each show an option for allocating T2.

Node 1.1: This node shows one option for allocating allocate T2. In this option since T2 takes only two weeks it is allocated to R1 during w1 and w2.

Node 1.2: This node shows the other option for allocating T2. In this option T2 is allocated to R2 in w4 after that resource finishes T1.

Nodes 1.1.1 and 1.2.1, which are both goal nodes, show the allocation of the MT for R1 in the allocations made in nodes 1.1 and 1.2, respectively.

Node 1.1.1: In this node the MT is allocated to occur in w3. The value associated with these allocations of T1, T2 and MT is:

Value=300 ($T1$)+200 ($T2$)−100 ($MT$)=$400.

Node 1.2.1: In this mode the MT is allocated to occur in w1. The value associated with these allocations of T1, T2 and MT is:

Value=300 ($T1$)+200 ($T2$)−100 ($MT$)−30 (3w penalty for $T2$)=$370

Therefore the optimal solution for this example is the solution of node 1.2.1 as that solution gives rise to the most revenue for the plant.

It should be appreciated that in the example given above an arbitrary sequence for allocating the tasks T1, T2 and the MT has been selected. As those skilled in the art can appreciate more complex criteria for selecting an order of task allocation can be considered. As is shown above, all of the solutions that can be generated according to a determined sequence of allocation have been evaluated. Criteria may exist to avoid expanding all of the branches of the trees thus reducing the computational effort.

Figure 2:
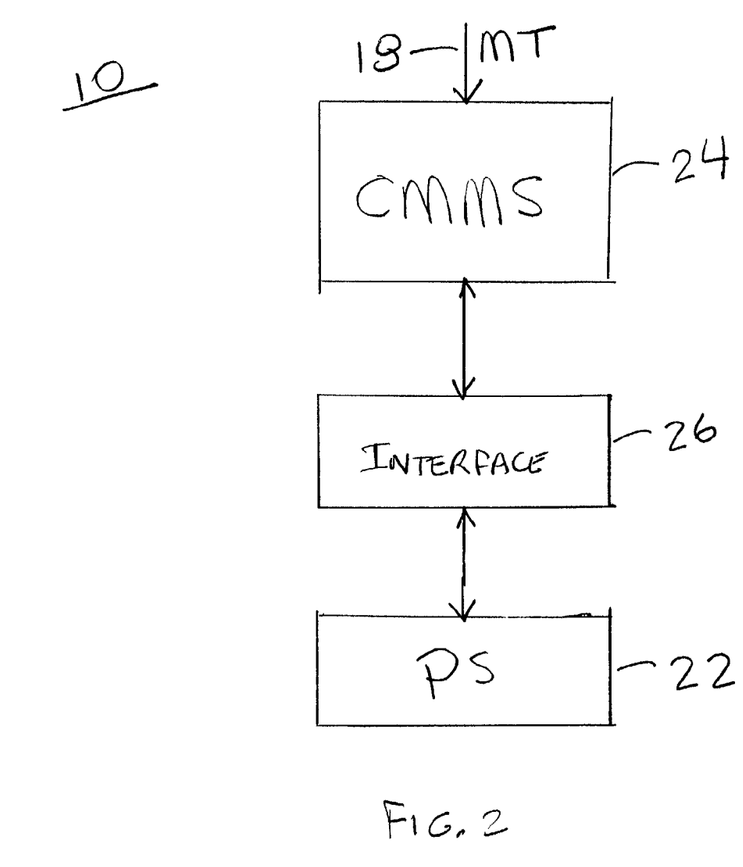
FIG. 2 shows a block diagram for another embodiment of the invention.

Referring now to FIG. 2, there is shown a block diagram of another embodiment for the system of the present invention. In this embodiment, the CMMS 24 in response to the acquisition either by receipt from an external source or internal generation of a new MT 18 defines a possible new maintenance schedule to take into account the maintenance action required by the new MT 18. As can be appreciated the new MT 18 may be generated outside of CMMS 24 or internally to CMMS 24 as for example by a periodically occurring maintenance action which is managed outside of CMMS 24.

In order to define the maintenance schedule, CMMS 24 considers as many factors as possible, depending on the complexity of the CMMS 24. Typically, CMMS 24 will consider at least the availability of suitable maintenance people and when needed the availability of spare parts.

Further CMMS 24 considers its own prioritization of the importance of the requested maintenance actions. Typically CMMS 24 considers any options and changes to schedule a new maintenance order based on the availability to CMMS 24 of information and data. Depending on the complexity of CMMS 24, the decision of CMMS 24 could be influenced by data and information available in the plant, including data from PS 22.

While the decision by CMMS 24 on the new maintenance schedule may be automatic it will typically require a human decision. Upon acquisition of the new MT 18, CMMS 24 performs its own analysis (which may be totally automatic or may require human decisions) in order to determine if there is any possibility to fit this maintenance request into the present production maintenance schedule. If CMMS 24 can fit the maintenance request into the present production schedule then no additional modification of the production schedule is needed. If CMMS 24 cannot fit the maintenance request into the present schedule a modification of both the production schedule and the maintenance schedule is expected. The module 26 shown in the embodiment of FIG. 2 functions in accordance with the present invention to reduce or even resolve the conflict between PS 22 and CMMS 24.

The module 26 in accordance with the present invention provides at least the interface to let CMMS 24 and PS 22 communicate with each other. In particular, module 26 after receiving from CMMS 24 at least the information on the new maintenance action to be performed as a result of the new MT, sends to PS 22 a "dummy production" or "blocking" order. These functions are shown in the blocks 25 and 27, respectively, of the flowchart of FIG. 2a. The dummy production or blocking order allows PS 22 to convert a maintenance request into a production schedule. Module 26 is also, from the information received from CMMS 24, able to determine the parts of the plant that are not available for production, the parts that are available with limitations in performance, quality, type of possible usage etc.

Figure 2A:
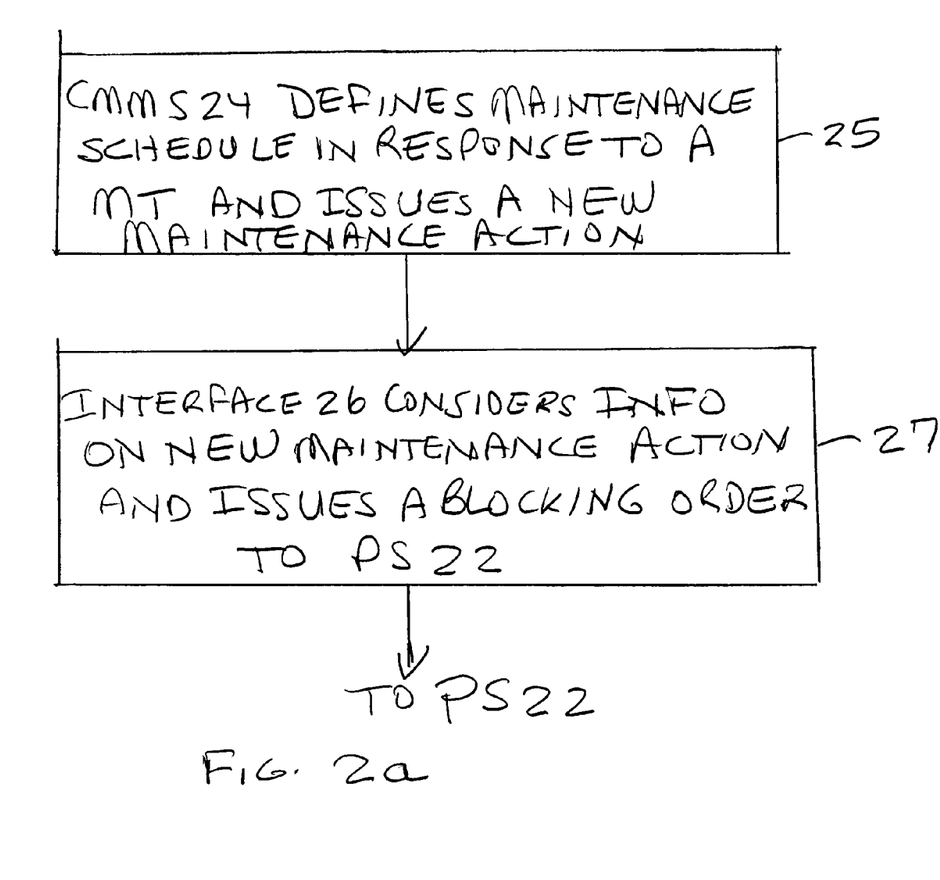
FIG. 2a shows in flowchart form the functions performed by CMMMS 24 and interface 26 of FIG. 2.

When CMMS 24 is not able to fit the new maintenance request into the maintenance schedule, the module 26 applies its own criteria in the form of an algorithm to optimize the maintenance request received from CMMS 24. This function of module 26 reduces or even optimizes the decision of CMMS 24 since module 26 includes criteria that are neither in CMMS 24 nor in PS 22. This function of module 26 includes any type of data that are not usually part of the CMMS 24 and PS 22 decision criteria.

As is described above, module 26 sends to PS 22 a dummy production or blocking order so that PS 22 can convert a maintenance request into a production schedule. Upon receipt of that order, PS 22 performs its own analysis (which may be totally automatic or may require human decisions) in order to check if there is any possibility to fit this "production" request into the present production schedule. If needed PS 22 will modify its own schedule.

If PS 22 is able to fit the "production" request into the present schedule it sends a confirmation back to CMMS 24 (typically using module 26 as the communications interface) and the joint schedule is accepted. If PS 22 is not able to fit this request into the schedule, PS 22 sends back to CMMS 24 (possibly using module 26 as the communications interface) a proposal for a new time-slot for the blocking order.

Upon receipt of the proposal for a new time slot, CMMS 24 determines if the new proposed schedule for the blocking order is compatible with the factors described above that CMMS 24 has taken into account in proposing a schedule for the maintenance action. If CMMS 24 determines that the new proposed schedule from PS 22 is compatible with those factors, then the new joint schedule is accepted.

If CMMS 24 determines that the new proposed schedule from PS 22 for the blocking order is not compatible then CMMS 24 defines a new tentative schedule for the performance of the blocking order and a new iteration or cycle of the CMMS 24 defining a new schedule for performing the blocking order and PS 22 accepting or not accepting that new schedule as described above is started. This cycling between CMMS 24 and PS 22 continues until the two systems can agree on the "production" schedule for the dummy production or blocking order. It is expected that the system of CMMS 24, PS 22 and module 26 converges toward a unique solution because on each cycle the algorithm of module 26 forces the system to reduce the options. In any case a maximum number of iterations are allowed after which a human decision is required.

Figure 2B:
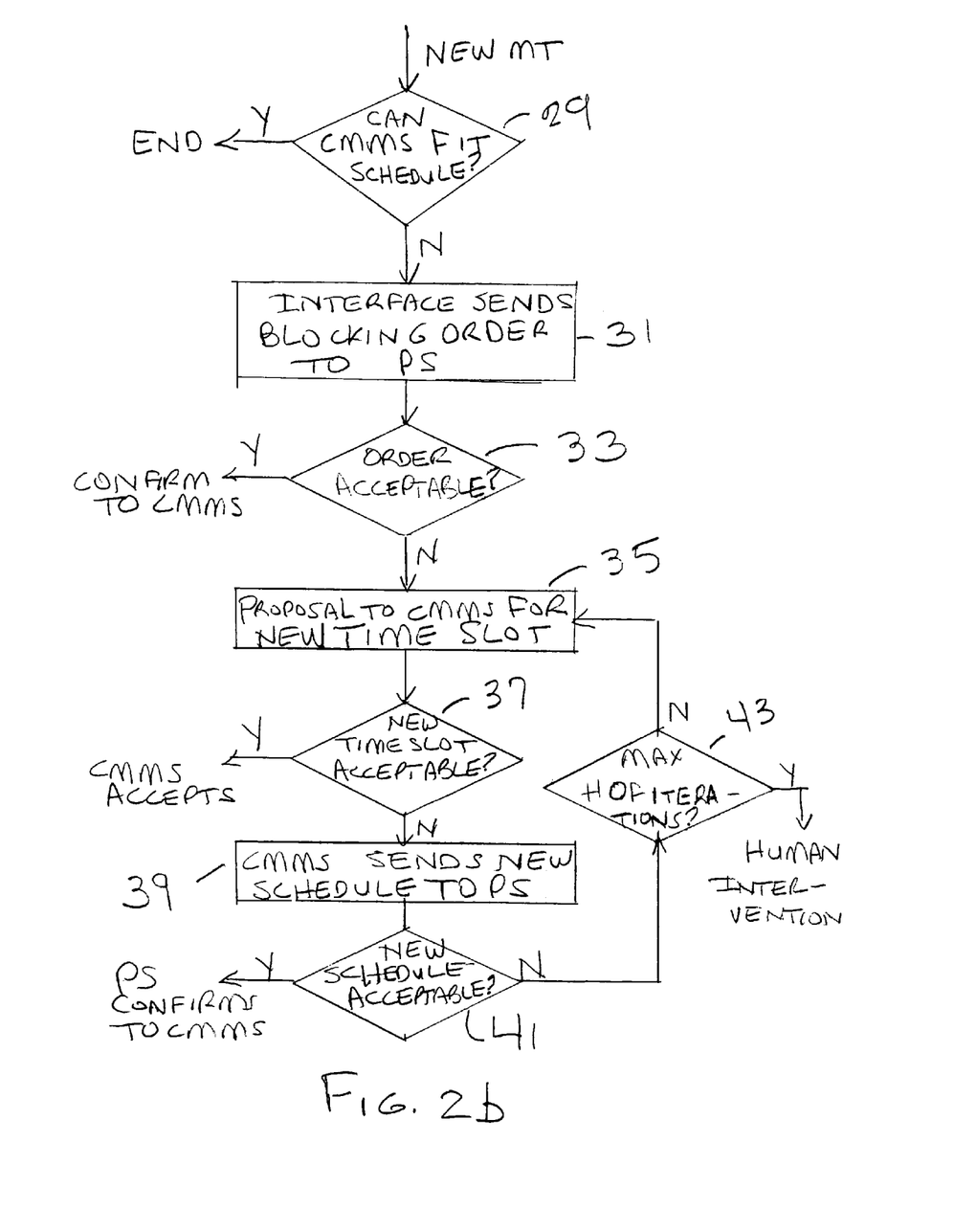
FIG. 2b shows a flowchart for the functions performed by PS 22, CMMS 24 and interface module 26 in response to the receipt of a MT.

The operation described above of PS 22, CMMS 24 and module 29 is shown in the flowchart of FIG. 2b where decision block 26 determines if the CMMS can fit the MT into its schedule, in block 31 interface module 26 sends the blocking order to PS 22, in decision block 33 PS 22 determines if the order is acceptable, in block 35 the PS proposes a new time slot to the CMMS 24 if the order is not acceptable, in decision block 37 the CMMS 24 determines if the new time slot is acceptable, in block 41 the CMMS 24 sends a new schedule to PS 22 if the new time slot is not acceptable to CMMS 24, in decision block 41 PS 22 determines if the new schedule is acceptable and decision block 43 determines if the maximum number of iterations has been reached if in decision block 41 PS 22 has determined that the new schedule is not acceptable.

In the embodiment shown in FIG. 2, PS 22, CMMS 24 and module 26 may either have functions in addition to those described above or function in a different manner than that described above after CMMS 24 receives a new MT 18 and notifies module 26 that a new MT 18 has been received. Several variations in configuration are possible in this preferred embodiment. In its widest application the module 26 can be placed any where in relation to PS 22. The basic concept is that module 26 functions not only as a gateway between PS 22 and CMMS 24 but also to apply its general or customized algorithms to be an arbitrator between PS 22 and CMMS 24. In this configuration the module 26 reduces mutual options between CMMS 24 and PS 22. Several of these variations of the embodiment shown in FIG. 2 are described below.

In one such variation the module 26 determines which part of the production is affected by the maintenance action to be performed in response to the MT and how the performance of that action impacts production. In making that determination, module 26 may use the criteria and techniques previously described for module 16 of FIG. 1. As described above, CMMS 24 in response to the acquisition of the new MT 18 defines a possible new maintenance schedule. This new maintenance schedule is sent by CMMS 24 to PS 22 as a blocking order.

PS 22 reviews the blocking order to determine if it can be accepted. In performing that review PS 22 takes into account the information on availability of the plant that it has received from module 26. PS 22 may be able to accept the blocking order by for example changing the production schedule.

If PS 22 accepts the blocking order it sends a confirmation of that acceptance to CMMS 24. As a result of that acceptance the plant has a schedule for both production and the requested maintenance action.

If PS 22 cannot accept the blocking order it proposes and sends to CMMS 24 a new schedule for performance of the blocking order, that is, the maintenance action required by MT 18. It should be appreciated that this new schedule also includes a new schedule for plant production.

CMMS 24 evaluates the proposed new schedule to determine if that schedule is compatible with the factors previously described that CMMS 24 has taken into account to schedule the maintenance action. If CMMS 24 determines that the new proposed schedule from PS 22 is compatible with those factors, then PS 22 is notified that the new schedule is accepted. As a result of that acceptance the plant has a schedule for both production and maintenance action.

If CMMS 24 determines that the proposed new schedule from PS 22 is not compatible then CMMS 24 defines a new tentative schedule for performance of the blocking order and a new iteration or cycle of CMMS 24 defining a new schedule for performing the blocking order and PS 22 accepting or not accepting the new schedule proposed by CMMS 24 and if not PS 22 proposing a new schedule as described above is started. This cycling between CMMS 24 and PS 22 continues until the two systems can agree on the "production" schedule for the dummy production or blocking order.

In another such variation, module 26 determines in the manner as is described above for the first variation which part of the production is affected by the maintenance action to be performed in response to the MT and how that action impacts the production. CMMS 24 sends a request for a blocking order to PS 22. PS 22 reviews the request for the blocking order taking into account the availability of the plant as is described above in the first variation in the review by PS 22 of the blocking order that it receives in that variation. PS 22 sends a proposal for a new production schedule for the blocking order to CMMS 24.

CMMS 24 reviews the proposal with the new production schedule in the manner described above for the first variation with the factors used to schedule maintenance. If CMMS 24 determines that the new schedule is compatible with those factors, then PS 22 is notified that CMMS 24 has accepted the new schedule. As a result of that acceptance the plant has a schedule for both production and maintenance action.

If CMMS 24 determines that the proposed new schedule from PS 22 is not compatible with the factors used to schedule maintenance then CMMS 24 sends a new request for a blocking order to PS 22. This transmission starts a new iteration or cycle of the CMMS 24 sending a new request for a blocking order to PS 22 and PS 22 sending a new schedule for the blocking order to CMMS 24. This cycling between CMMS 24 and PS 22 continues until the two systems can agree on the "production" schedule for the dummy production or blocking order.

In yet another such variation, module 26 determines, in the manner described above for the first variation, which part of the production is affected by the maintenance action to be performed in response to the MT and how that action impacts the production. CMMS 24 or module 26 sends a request for a blocking order to PS 22.

PS 22 reviews the request for the blocking order taking into account the availability of the plant as is described above in the review in the first variation by PS 22 of the blocking order that it receives in that variation. PS 22 sends a proposal for a new production schedule for the blocking order to CMMS 24.

CMMS 24 reviews the proposal with the new production schedule in the manner described above for the first variation with the factors used to schedule maintenance. If CMMS 24 determines that the new schedule is compatible with those factors, then PS 22 is notified that CMMS 24 has accepted the new schedule. As a result of that acceptance the plant has a schedule for both production and maintenance action.

If CMMS 24 determines that the proposed new schedule from PS 22 is not compatible with the factors used to schedule maintenance then CMMS 24 or module 26 sends a new request for a blocking order to PS 22. This transmission starts a new iteration or cycle of the CMMS 24 or module 26 sending a new request for a blocking order to PS 22 and PS 22 sending a new schedule for the blocking order to CMMS 24. This cycling between these devices continues until PS 22 and CMMS 24 can agree on the "production" schedule for the dummy production or blocking order.

In the embodiment of the present invention shown in FIG. 2 and the variations of that embodiment described immediately above the module 26 acts essentially as a communications interface between PS 22 and CMMS 24. In that embodiment and its variations the only optimization criterion is to find a joint maintenance and production schedule that is compatible with existing constraints.

Figure 3:
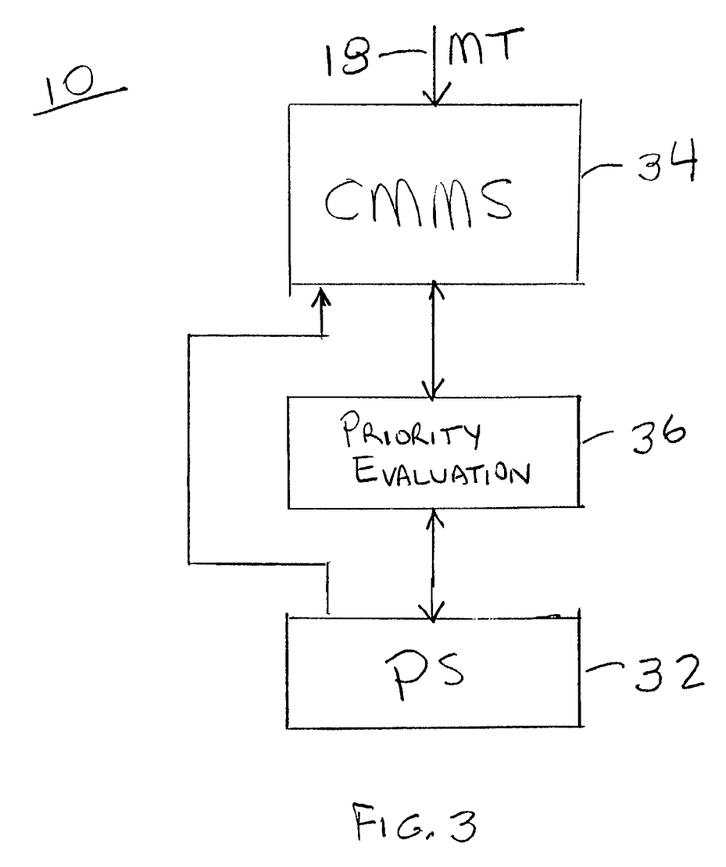
FIG. 3 shows a block diagram for a further embodiment for the present invention.

Referring now to FIG. 3, there is shown a further embodiment of the present invention in which a module 36 also has an optimization function as is described below. In this embodiment, a CMMS 34 acquires either by receipt from an external source or internal generation a MT 18. Upon acquisition either by receipt or internal generation of the MT 18, the CMMS 34 asks module 36 for confirmation of a time slot to perform the maintenance action required by MT 18.

In response to the request by CMMS 34 of a confirmation of a time slot, module 36 evaluates the priorities by:
    a) obtaining information from PS 32 about the urgency of production;
    b) comparing the information about the urgency of production with the mean time to failure of the asset that initiated the MT 18; and
    c) finding based on predetermined criteria, which may be economic, technical or otherwise, the right time slot for the maintenance.

The module 36 transmits a request for the time slot it has determined for the maintenance to PS 32. PS 32 checks to see if that time slot is available. If the time slot is available PS 32 sends a confirmation of that availability to module 36 and CMMS 34 but it is also possible that module 36 passes the confirmation from PS 32 to CMMS 34.

If the time slot is not available, PS 32 rejects the request and either provides an alternative proposal or informs module 36 that the slot is not available. If PS 32 provides an alternative proposal it bases that proposal on it evaluation of the availability of the plant as is described above in the review by PS 22 in the first variation of the embodiment shown in FIG. 2 of the request of the blocking order it receives in that variation.

Once a time slot is confirmed as available, CMMS 34 determines if the necessary personnel, spare parts, if needed, and tools are available for the maintenance action to be performed in that time slot. If personnel, tools or parts are not available, CMMS 34 notifies module 36.

In one variation of the embodiment shown in FIG. 3 the module 36 in evaluating the priorities to arrive at the right time slot for performance of the maintenance action considers several criteria including:
    a) the possibility of using the plant at a reduced capacity;
    b) the possibility of using the plant with a lower quality in the products produced by the plant;
    c) what asset has to be maintained and when does it have to be maintained including the possibility of stopping maintenance of the equipment; and d) when production will start of which product using what part of the plant including the possibility of even refusing orders or using the plant for production of products that do not use the part of the plant that has the action that needs the maintenance action.

In any of the embodiments described herein of the present invention, confirmation from both PS 12, 22 or 32 and one or more MTs 18 are needed to start the maintenance action. If either the confirmation or one or more MTs 18 are missing and a predetermined maximum number of cycles have occurred then human interaction is requested.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for optimizing the maintenance of assets and production comprising:
   a) acquiring at least one maintenance trigger indicative that a maintenance action is or may be required for at least one of said assets;
   b) in response to said acquired at least one maintenance trigger defining in real time a maintenance schedule for said maintenance action; and
   c) transmitting in response to said defined maintenance schedule a request to a system that schedules production for a period of time in a production schedule to perform said maintenance action.

2. The method of claim 1 wherein said production scheduling system produces a production schedule and said method further comprises said production scheduling system determining the possibility of fitting said request for a period of time in said production schedule into said production schedule.

3. The method of claim 2 wherein said at least one maintenance trigger is acquired either by being received at or generated by a computerized maintenance management system and said method further comprises said production scheduling system transmitting a confirmation to said computerized maintenance management system when said production scheduling system accepts said request for a period of time in said production schedule.

4. The method of claim 2 wherein said at least one maintenance trigger is acquired either by being received at or generated by a computerized maintenance management system and said method further comprises said production scheduling system transmitting to said computerized maintenance management system a new time for performance of said maintenance action when said production scheduling system cannot accept said request for a period of time in said production schedule.

5. The method of claim 4 further comprising said computerized maintenance management system considering the feasibility of said new time for performance of said maintenance action transmitted by said production scheduling system.

6. A method for optimizing the maintenance of assets and production comprising:
   a) acquiring at least one maintenance trigger indicative that a maintenance action is or may be required for at least one of said assets;
   b) in response to said acquired at least one maintenance trigger requesting in real time a period of time in a production schedule to perform said maintenance action; and
   c) determining by use of a predetermined criteria related to said production and in response to said request for said period of time in said production schedule to perform said maintenance action a time for performance of said maintenance action.

7. The method of claim 6 further comprising transmitting a request for said period of time in said production schedule to a system that schedules said production.

8. The method of claim 7 further comprising said production scheduling system determining the availability of said requested period of time in said production schedule.

9. The method of claim 8 wherein said determining said period of time in said maintenance schedule for performance of said maintenance action is performed by an asset optimization system and said method.

10. The method of claim 7 wherein said at least one maintenance trigger is acquired by being received at or generated by a computerized maintenance management system and said determining said period of time in said production schedule for performance of said maintenance action is performed in other than said production scheduling system and said computerized maintenance management system.

11. The method of claim 10 wherein said determining said period of time in said production schedule for performance of said maintenance action is performed by a means for optimizing assets to a predetermined level.

12. The method of claim 11 wherein said means is an asset optimization system.

13. A system for optimizing the maintenance of assets and production comprising:
   a) a maintenance scheduling system responsive to at least one maintenance trigger indicative that a maintenance action is or may be required for at least one of said assets to define in real time a maintenance schedule for said maintenance action;
   b) a system for scheduling production of at least a certain quantity of a certain product; and
   c) means responsive to said defined maintenance schedule received from maintenance scheduling system for transmitting to said production scheduling system a request for a period of time in a production schedule to perform said maintenance action.

14. The system of claim 13 wherein said maintenance scheduling system is a computerized maintenance management system.

15. A system for optimizing the maintenance of assets and production comprising:
   a) a system for scheduling production of at least a certain quantity of a certain product;
   b) a maintenance scheduling system responsive to at least one maintenance trigger indicative that a maintenance action is or may be required for at least one of said assets to generate in real time a request for a period of time in said production scheduling system to perform said maintenance action; and
   c) means responsive to said request for said period of time to perform said maintenance action in said production scheduling system for determining by use of a predetermined criteria related to said production and said time to perform said maintenance action a time for performance of said maintenance action and transmitting said time for performance of said maintenance action to said production scheduling system.

16. The system of claim 15 wherein said maintenance scheduling system is a computerized maintenance management system.

* * * * *